US012688749B2

(12) United States Patent
Yumoto

(10) Patent No.: US 12,688,749 B2
(45) Date of Patent: Jul. 21, 2026

(54) NON-TRANSITORY COMPUTER-READABLE STORAGE MEDIUM STORING PRINTING CONTROL PROGRAM, PRINTING CONTROL DEVICE, PRINTING METHOD

(71) Applicant: SEIKO EPSON CORPORATION, Tokyo (JP)

(72) Inventor: Atsushi Yumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 19/050,158

(22) Filed: Feb. 11, 2025

(65) Prior Publication Data

US 2025/0259500 A1 Aug. 14, 2025

(30) Foreign Application Priority Data

Feb. 13, 2024 (JP) ................................. 2024-019476

(51) Int. Cl.
*G06F 3/12* (2006.01)
*G07F 17/26* (2006.01)
(52) U.S. Cl.
CPC .......... *G07F 17/266* (2013.01); *G06F 3/1222* (2013.01); *G06F 3/1236* (2013.01); *G06F 3/1238* (2013.01); *G06F 3/1292* (2013.01)
(58) Field of Classification Search
CPC .... G07F 17/266; G06F 3/1222; G06F 3/1236; G06F 3/1238; G06F 3/1292; G06F 2206/1504; G06F 3/1239; G06F 3/1204; G06F 3/1224; G06F 3/1285; G06Q 20/145; G06Q 20/18; G06Q 20/4014
See application file for complete search history.

(56) References Cited

U.S. PATENT DOCUMENTS

| | | | |
|---|---|---|---|
| 2009/0207440 A1* | 8/2009 | Kaneko ................. | G03G 21/02 |
| | | | 705/40 |
| 2010/0095295 A1 | 4/2010 | Harada | |
| 2018/0213115 A1 | 7/2018 | Sun et al. | |
| 2023/0244418 A1 | 8/2023 | Tsunekawa | |

FOREIGN PATENT DOCUMENTS

| | | |
|---|---|---|
| JP | 2000-309148 A | 11/2000 |
| JP | 2018-118406 A | 8/2018 |
| WO | 2023/075836 A1 | 5/2023 |

\* cited by examiner

*Primary Examiner* — Jamara A Franklin
(74) *Attorney, Agent, or Firm* — Spencer Fane LLP

(57) ABSTRACT

According to an aspect of the present disclosure, there is provided a non-transitory computer-readable storage medium storing a printing control program, the printing control program causing a computer to execute transmission processing, billing processing, and settlement processing. In the transmission processing, print data is transmitted to a printer. In the billing processing, billing is received in a sales server in which a vendor of an operating system of the computer sells an application program. In the settlement processing, settlement is performed when the print data is transmitted and printing is successful in the printer.

13 Claims, 9 Drawing Sheets

Figure 1:
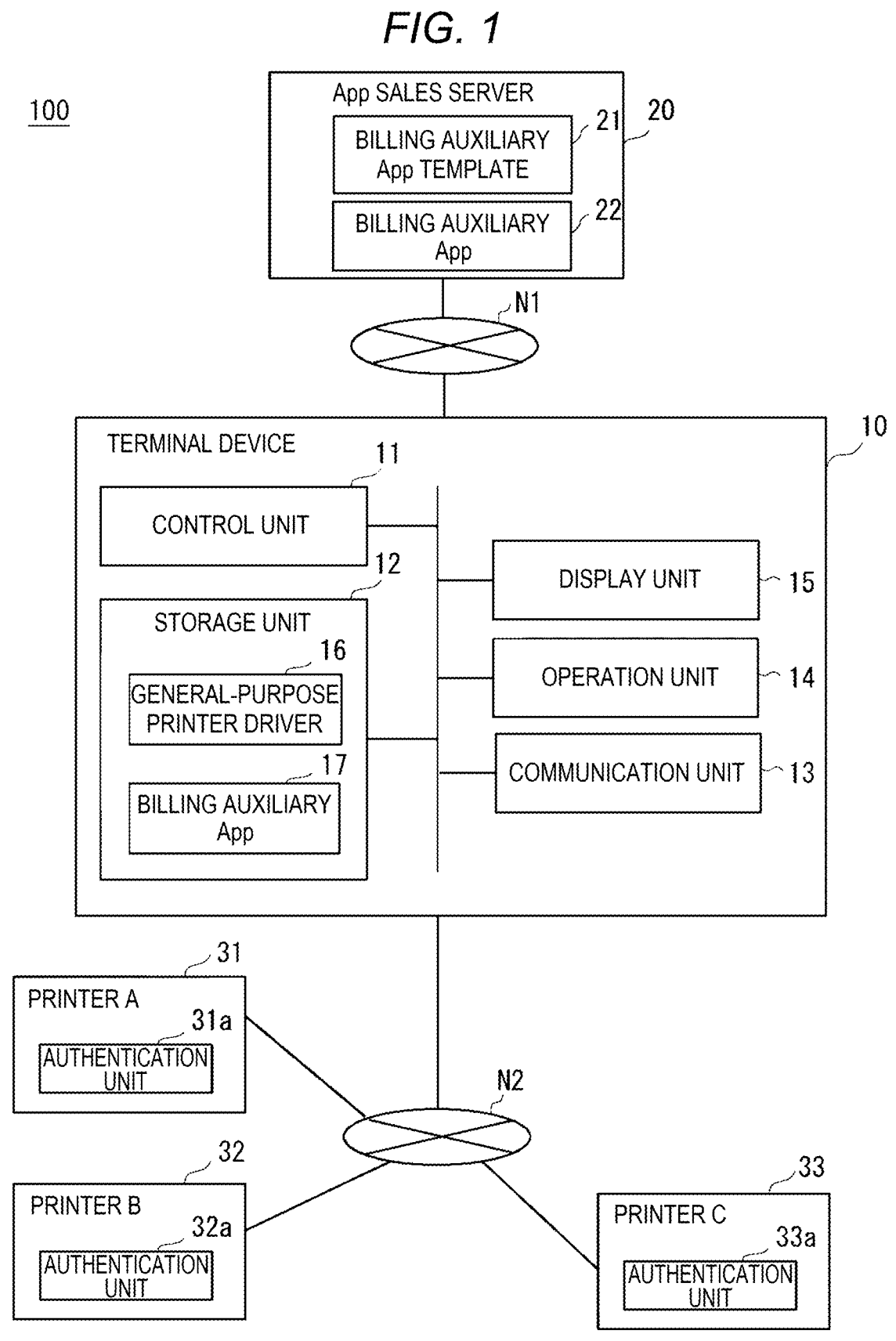

App SALES SERVER — 20

BILLING AUXILIARY App TEMPLATE — 21

BILLING AUXILIARY App — 22

N1

TERMINAL DEVICE — 10

CONTROL UNIT — 11

STORAGE UNIT — 12

GENERAL-PURPOSE PRINTER DRIVER — 16

BILLING AUXILIARY App — 17

DISPLAY UNIT — 15

OPERATION UNIT — 14

COMMUNICATION UNIT — 13

PRINTER A — 31

AUTHENTICATION UNIT — 31a

N2

PRINTER B — 32

AUTHENTICATION UNIT — 32a

PRINTER C — 33

AUTHENTICATION UNIT — 33a

*FIG. 4*

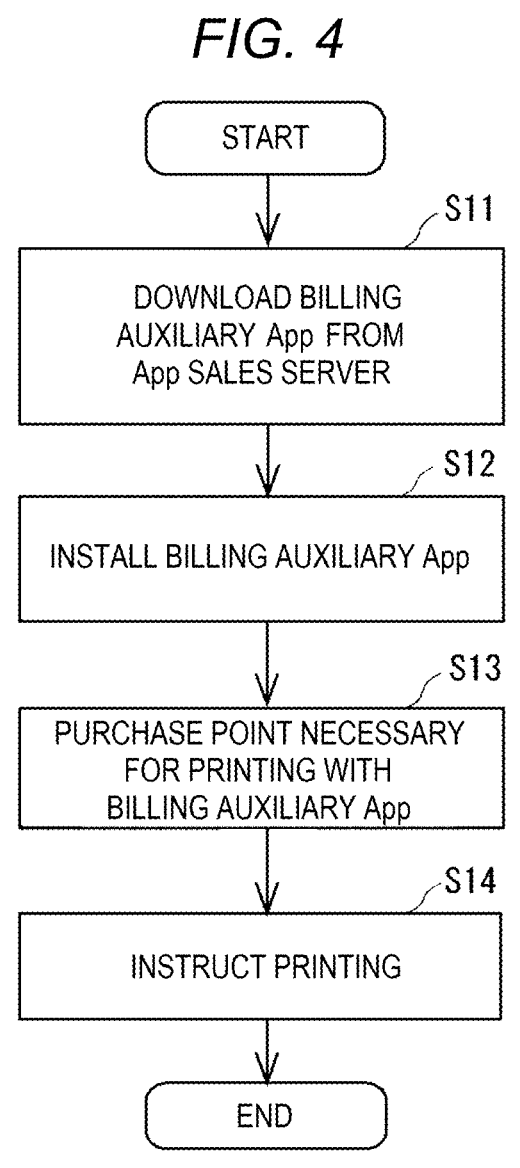

START

S11

DOWNLOAD BILLING
AUXILIARY App FROM
App SALES SERVER

S12

INSTALL BILLING AUXILIARY App

S13

PURCHASE POINT NECESSARY
FOR PRINTING WITH
BILLING AUXILIARY App

S14

INSTRUCT PRINTING

END

| FUNCTION NAME | IPP Attribute |
|---|---|
| SIZE OF DOCUMENT | media-size |
| COLOR | print-color-mode |
| DOUBLE-SIDED/SINGLE-SIDED | sides |
| NUMBER OF PAGES | pages |

NON-TRANSITORY COMPUTER-READABLE STORAGE MEDIUM STORING PRINTING CONTROL PROGRAM, PRINTING CONTROL DEVICE, PRINTING METHOD

The present application is based on, and claims priority from JP Application Serial Number 2024-019476, filed Feb. 13, 2024, the disclosure of which is hereby incorporated by reference herein in its entirety.

BACKGROUND

1. Technical Field

The present disclosure relates to a non-transitory computer-readable storage medium storing a printing control program, a printing control device, and a printing method.

2. Related Art

JP-A-2018-118406 discloses a document printing system for the purpose of realizing reduction in labor costs and safe receipt of a fee.

JP-A-2018-118406 is an example of the related art.

However, in the document printing system described in JP-A-2018-118406, in order for a user to perform billing printing, it is necessary to separately provide a settlement server that performs settlement corresponding to billing.

Thus, in a print system that performs billing printing, it is desired to develop a technique that can perform billing without separately preparing a settlement server that performs settlement corresponding to billing.

SUMMARY

According to an aspect of the present disclosure, there is provided a non-transitory computer-readable storage medium storing a printing control program, the printing control program causing a computer to execute: transmission processing of transmitting print data to a printer; billing processing of receiving billing in a sales server in which a vendor of an operating system of the computer sells an application program; and settlement processing of performing settlement when the print data is transmitted and printing is successful in the printer.

According to an aspect of the present disclosure, there is provided a printing control device including: a general-purpose printer driver; a transmission processing unit configured to transmit print data to a printer; a billing processing unit configured to receive billing in a sales server in which a vendor of an operating system of the printing control device sells an application program; and a settlement processing unit configured to perform settlement when the print data is transmitted and printing is successful in the printer.

According to an aspect of the present disclosure, there is provided a printing method including: transmission processing of a computer transmitting print data to a printer; billing processing of the computer receiving billing in a sales server in which a vendor of an operating system of the computer sells an application program; and settlement processing of the computer performing settlement when the print data is transmitted and printing is successful in the printer.

BRIEF DESCRIPTION OF THE DRAWINGS

FIG. 1 is a block diagram illustrating a configuration example of a print system according to an embodiment.

FIG. 4 is a flowchart illustrating an example of processing performed by a user side in the printing processing illustrated in FIG. 2.

FIG. 6 is a diagram illustrating an example of information referred to in a first example explained with reference to FIG. 5.

DESCRIPTION OF EMBODIMENTS

Figure 2:
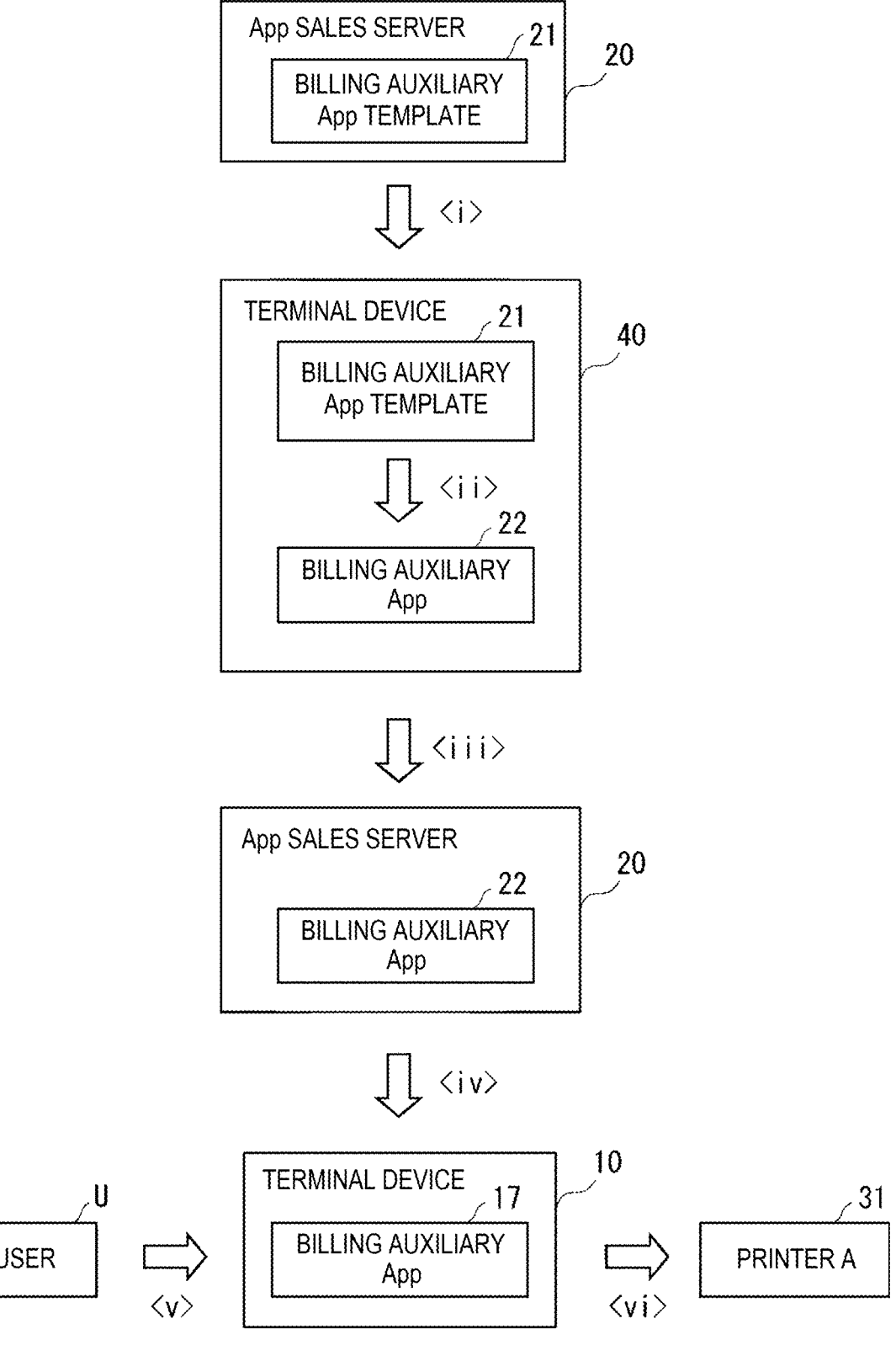
FIG. 2 is a schematic diagram for schematically explaining a flow of printing processing in the print system of FIG. 1.

An embodiment of the present disclosure is explained below with reference to the drawings. Figures are merely exemplification for explaining the embodiment of the present disclosure. Not all of elements explained in the embodiment of the present disclosure are essential elements of the present disclosure.

Embodiment

Configuration of a Print System

A configuration example of a print system according to an embodiment is explained with reference to FIG. 1. FIG. 1 is a block diagram illustrating the configuration example of the print system according to the embodiment.

As illustrated in FIG. 1, a print system 100 according to the present embodiment can include a terminal device 10, an App sales server 20, a printer A(31), a printer B(32), and a printer C(33). App is used as an abbreviation of an application program. In the present specification, the server refers to a server computer or a server device.

The terminal device 10 is an information processing device having a communication function such as a personal computer (PC), a smartphone, or a tablet terminal and may be used by a user who desires printing. For, for example, processing of transmitting a print request, the terminal device 10 is connected to the printer A(31), the printer B(32), and the printer C(33) via a network N2. Although not illustrated, the print system 100 can include a plurality of terminal devices 10.

All of the printer A(31), the printer B(32), and the printer C(33) are examples of a printer and, when receiving print data, can print the print data on a medium. The printers produce a print by performing such printing. For convenience, the print system 100 is explained on the premise that three printers are provided in the print system 100 as explained above. However, at least one printer only has to be provided in the print system 100. The printer A(31) can include an authentication unit 31a for authenticating whether a print request is a print request from a user having authority to use. The printer B(32) and the printer C(33) can respectively include an authentication unit 32a and an authentication unit 33a as the same functions as the authentication unit 31a. The authentication unit 31a is explained below in a first example of printing processing.

The printers only have to be devices having a communication function and a print function but may be a multifunction peripheral having other functions such as a scanner function, a copy function, and a facsimile transmission function. The printers can also be referred to as printing apparatus or an image forming apparatus. A printing scheme in the printers do not matter. Various printing schemes such as an inkjet printing scheme and a laser printing scheme can be applied. The printers can be installed in a public place such as a school, a library, or a convenience store. However, installation places are not limited to these examples.

The print system 100 performs printing from a selected printer among the printer A(31), the printer B(32), and the printer C(33) according to user operation from the terminal device 10. Since the terminal device 10 performs control for such printing, the terminal device 10 can also be referred to as printing control device.

The terminal device 10 can be connected to the App sales server 20 via a network N1. The terminal device 10 can access the App sales server 20 and download and install various application programs. A free application program can be included in application programs provided by the App sales server 20.

The App sales server 20 is a sales server in which a vendor of an operating system (OS) of a computer sells an application program. An example of the computer is the terminal device 10. The App sales server 20 is a server that stores various application programs in a downloadable state from the terminal device 10 in order to provide the application programs to the terminal device 10. As a company of an application store, which is a store providing various application programs, the vendor of the OS or a company entrusted by the vendor can perform management and operation of the App sales server 20.

In the following explanation, configuration examples of the App sales server 20 and the terminal device 10 are explained in detail. Note that explanation of configuration examples of the printers is omitted.

Configuration Example of the App Sales Server 20

Although not illustrated, the App sales server 20 can include a storage unit that stores an application program to be provided, a communication unit that communicates with the terminal device 10 via the network N1, and a control unit that controls the entire App sales server 20. Like a control unit 11 of the terminal device 10 explained below, the control unit can include, for example, an arithmetic processing device, a working memory, and a storage device that stores a control program, parameters, and the like. Naturally, the control program stored in the control unit of the App sales server 20 is different from a control program in the control unit 11.

In order to provide an application program, the App sales server 20 only has to cause the storage unit to store an installer, which is an execution file for installing the application program. The following explanation is based on the premise that the terminal device 10 downloads an installer of a target application program and installs the application program. However, by executing the installer on the App sales server 20, the target application program may be substantially downloaded and installed in the terminal device 10.

The App sales server 20 can provide one or a plurality of billing auxiliary Application programs 22 as application programs. In the following explanation, the billing auxiliary application program is abbreviated as billing auxiliary App.

The billing auxiliary App 22 is, for example, an application program to be provided for sale or free provision to the App sales server 20 by an administrator who manages the printer A(31). In this case, the billing auxiliary App 22 can be an application program for causing the user of the terminal device 10 to execute printing in the printer A(31) while involving billing. That is, the billing auxiliary App 22 can be, for example, an application program that assists in causing the user of the terminal device 10 to execute billing printing in the printer A(31), the application program being provided by the administrator who manages the printer A(31).

Thus, the App sales server 20 can store the installer of the billing auxiliary App 22 for each administrator in the storage unit. For example, when the administrator of the printer A(31) and an administrator of the printer B(32) are different, the storage unit of the App sales server 20 can store an installer explained below. That is, the storage unit stores an installer of the billing auxiliary App 22 for billing printing in the printer B(32) separately from the installer of the billing auxiliary App 22 for billing printing in the printer A(31). A billing auxiliary App 17 may be, for example, an application program provided by a common administrator of the printer A(31) and the printer C(33).

The App sales server 20 can store a billing auxiliary App template 21 in the storage unit. The billing auxiliary App template 21 is, for example, a template based on which an administrator of the printer A(31) and the printer C(33) generates the billing auxiliary App 22 for billing printing in the printer A(31) or the printer C(33). That is, the billing auxiliary App template 21 is a template based on which an administrator, who manages one or a plurality of printers, generates the billing auxiliary App 22 that assists billing printing in a management target printer. For example, even when the administrator of the printer A(31) and the printer C(33) and the administrator of the printer B(32) are different, the common billing auxiliary App template 21 is downloaded. Then, for each of the administrators, separate billing auxiliary Apps 22 are generated and registered in the App sales server 20.

As described above, the billing auxiliary App 22 can be provided free of charge. However, the billing auxiliary App 22 may be provided in a sales format, that is, may be provided for a fee. When the billing auxiliary App 22 is provided for a fee, for example, the fee can be billed as an admission fee of a print service provided by an administrator of one or a plurality of printers relating to the billing auxiliary App 22. Similarly, the billing auxiliary App template 21 may be provided free of charge or may be provided for a fee. When the billing auxiliary App template 21 is provided for a fee, for example, an application store operating the App sales server 20 can bill a fee to an administrator of a printer as a registration fee or the like of the billing auxiliary App 22.

Download of an installer of an application program provided by the App sales server 20 for a fee means sale of the application program. For that reason, although not illustrated, the App sales server 20 includes a billing unit that bills a price of a target application program. The billing unit can be implemented by the control unit and the communication unit explained above. The billing unit can be configured such that, for example, the control unit executes a program for performing such billing processing in cooperation with the communication unit. Further, the App sales server 20 may be connected to, for example, a not-illustrated electronic settlement server or the like and the billing unit may settle an amount billed via the electronic settlement server. The electronic settlement server can be, for example, a server that performs settlement by a credit card of a credit card company, a server that performs settlement by a debit card issued by a financial institution, or the like.

Configuration of the Terminal Device 10

As illustrated in FIG. 1, the terminal device 10 can include the control unit 11, a storage unit 12, a communication unit 13, an operation unit 14, and a display unit 15.

The control unit 11 controls the entire terminal device 10. The control unit 11 can include, for example, an arithmetic processing device, a working memory, and a storage device that stores a control program, parameters, and the like. The arithmetic processing device can be a central processing unit (CPU), a graphics processing unit (GPU), or the like. The control unit 11 can also be implemented as a system on a chip (SoC). As it is seen from the examples explained above, the control unit 11 can be configured to store the control program in an executable state. However, the control unit 11 can also be configured to store a part of the control program as a circuit configuration like a field programmable gate array (FPGA) or can be configured as a dedicated circuit.

The control program can include a program for the arithmetic processing device to execute processing relating to printing in cooperation with the storage unit 12, the communication unit 13, the operation unit 14, and the display unit 15. The control program can include an OS. Since the OS is an OS installed in the terminal device 10, the OS is a type of OS corresponding to a model or the like of the terminal device 10. A vendor of the OS is a seller who sells an application program with the App sales server 20. Naturally, the seller includes a company that is entrusted by the vendor of the OS to sell the application program. The control program can include a Web browser in the OS or outside the OS. In the following explanation, an example is explained in which at least a part of the control program is stored in the storage unit 12 provided separately from the control unit 11. However, the storage unit 12 may be a part of a storage device in the control unit 11. That is, the storage unit 12 can be grasped as a part of the control unit 11.

The storage unit 12 is, for example, a storage device by a hard disk drive, a solid state drive, or another memory. A general-purpose printer driver 16 and the billing auxiliary App 17 are stored in the storage unit 12 as a part of the control program in a state executable from the control unit 11. The billing auxiliary App 17 is a printing control program for controlling billing printing.

Besides, the storage unit 12 can store various data such as a file to be printed. Although not illustrated, a vendor auxiliary Application program that assists the general-purpose printer driver 16 can also be stored in the storage unit 12 in a state executable from the control unit 11. In the following explanation, the vendor auxiliary Application program is abbreviated as vendor auxiliary App. The vendor auxiliary App is an application program that assists the general-purpose printer driver 16 and is used for expanding functions of the general-purpose printer driver 16, for example, for a function specific to a printer. For that reason, the general-purpose printer driver 16 can have a function of starting the vendor auxiliary App and transmitting print data to the vendor auxiliary App. The vendor auxiliary App can be, for example, a Print Support Application (PSA).

The vendor auxiliary App can be an application program different from the billing auxiliary App 17 or an application program including the billing auxiliary App. Alternatively, the vendor auxiliary App can be an application program cooperating with the billing auxiliary App 17 such as an application program provided with a function of billing printing via the billing auxiliary App 17.

The communication unit 13 is a part that communicates by radio or wire with an external device such as the App sales server 20 via the network N1 according to various predetermined communication standards such as a mobile communication standard and a Wi-Fi (registered trademark, the same applies below) standard. The communication unit 13 is a part that communicates by wire or radio with external devices such as the printer A(31), the printer B(32), and the printer C(33) via the network N2 according to various predetermined communication standards such as a mobile communication standard and a Wi-Fi standard. The communication unit 13 can be implemented by one or a plurality of communication interfaces capable of performing these kinds of communication.

The operation unit 14 is a part that receives operation by the user of the terminal device 10 and can be referred to as operation reception unit as well. The operation unit 14 can be implemented by, for example, any one or a plurality among a physical button, a touch panel mounted on the display unit 15, a pointing device, and a keyboard. In a configuration in which the operation unit 14 includes the touch panel, the operation unit 14 including the display unit 15 and the touch panel can be collectively referred to as operation panel of the terminal device 10.

The display unit 15 is a part for displaying a user interface (UI) image for operating the terminal device 10 and is configured by a display device such as a liquid crystal display or an organic electroluminescence display. The display unit 15 can also include a display and a drive circuit that drives the display.

The general-purpose printer driver 16 is explained. The general-purpose printer driver 16 is an OS-standard printer driver included in an OS included in the control program or attached to the OS. That is, the general-purpose printer driver 16 is a general-purpose printer driver provided by a vendor providing the OS. For example, the general-purpose printer driver 16 is a standard printer driver for a Windows (registered trademark, the same applies below) OS. The general-purpose printer driver 16 can be a program capable of controlling various types of printers to execute printing. The general-purpose printer driver 16 can also be referred to as OS general-purpose printing program or general-purpose printing program.

The general-purpose printer driver 16 is a driver that uses a general-purpose protocol for a search for a printer and for printing. For example, the general-purpose printer driver 16 uses mDNS/DNS-SD for the search for a printer and uses IPP for the printing in the printer. Here, DNS is an abbreviation of Domain Name System. mDNS is an abbreviation of multicast DNS. DNS-SD is an abbreviation of DNS Service Discovery. IPP is an abbreviation of Internet Printing Protocol.

As it is seen from this example as well, the general-purpose printer driver 16 can be, for example, an IPP Class driver. IPP is an example of a standard protocol for controlling management of a printer and printing. The IPP acquires and controls printer information according to HTTP (Hyper Text Transfer Protocol) POST requests and responses. In the IPP, it is possible to perform printer setting and printer state acquisition. Here, secure communication can be performed by using HTTP Secure (HTTPS) instead of the HTTP.

The billing auxiliary App 17 is explained. The billing auxiliary App 17 can be, for example, a program for assisting the general-purpose printer driver 16 and causing the terminal device 10 to execute billing printing control in a target printer, that is, printing control for supporting a billing printing function in the printer. In the following explanation, an example is explained in which the billing auxiliary App 17 assists the general-purpose printer driver 16 and controls billing printing to add a billing printing function to a function of the general-purpose printer driver 16 and expand functions. For that reason, in an example explained below, the general-purpose printer driver 16 can have a function of starting the billing auxiliary App 17 and transmitting print data to the billing auxiliary App 17. Communication between the general-purpose printer driver 16 and the billing auxiliary App 17 is inter-process communication.

The billing auxiliary App 17 may be, for example, a PSA. The billing auxiliary App 17 can be the billing auxiliary App 22 provided by the App sales server 20 and installed by downloading an installer from the App sales server 20. That is, the App sales server 20 can be an original sales server that has downloaded the billing auxiliary App 17 serving as the PSA to the terminal device 10. The following explanation is based on the premise that the billing auxiliary App 17 serving as the PSA is the billing auxiliary App 22 as explained above. However, the billing auxiliary App 17 may be an application installed by, for example, being downloaded by other than the App sales server 20.

In the following explanation, an example is explained in which the billing auxiliary App 17 is an application program provided by a common administrator of the printer A(31) and the printer C(33). In the following explanation, an example is explained in which the user performs billing printing in the printer A(31). However, the same applies when billing printing in the printer C(33) is performed. When billing printing in the printer B(32) is performed, the billing auxiliary App for the printer B(32) is used.

The billing auxiliary App 17 is a printing control program for controlling billing printing. More specifically, the billing auxiliary App 17 is a program for causing a computer to execute transmission processing, billing processing, and settlement processing explained below. Here, the computer also indicates the terminal device 10 or the control unit 11.

In the transmission processing, print data is transmitted to, of the printers A(31) and C(33), the printer A(31) designated by the user. This transmission processing is performed via the communication unit 13. In addition, in this example, the billing auxiliary App 17 assists the general-purpose printer driver 16 and performs billing printing. Thus, in the transmission processing, for example, after print data received from the general-purpose printer driver 16 is converted into print data associated with billing, the print data may be transmitted to the printer A(31) directly or via the general-purpose printer driver 16. The print data associated with billing only has to be print data that, printing of which can be permitted by the authentication unit 31*a* of the printer A(31). If the user can be authenticated in the authentication unit 31*a*, the administrator of the printer A(31) can collect, via billing processing explained below, a price of printing from the application store of the vendor of the OS according to, for example, a point paid in advance. This point is explained below.

In the billing processing, billing is received by the App sales server 20 in which the vendor of the OS of the terminal device 10 sells an application program. This billing is billing for a service for causing the printer A(31) to print print data. Thus, a billing amount sometimes changes according to the number of prints, a size and a type of paper, and the like. In the billing processing, communication is performed with the App sales server 20 via the communication unit 13 and the network N1 to receive billing. That is, the App sales server

20 bills the terminal device 10 for a service for printing in the printer A(31) via the communication unit of the App sales server 20 and the network N1.

Here, since the explanation is based on the premise that the billing auxiliary App 17 serving as the PSA is the billing auxiliary App 22, the billing processing is processing in which the billing auxiliary App 17 itself bills the terminal device 10 in an original application store downloaded to the terminal device 10. That is, the billing processing is processing in which the PSA itself receives billing using the original application store.

In the settlement processing, settlement is performed when print data is transmitted and printing is successful in the printer A(31). This settlement is settlement of the billing received in the billing processing. Specific examples of the settlement processing are explained in a first example to a third example of the printing processing together with a specific example of the transmission processing.

Flow of the Printing Processing in the Print System 100

Figure 3:
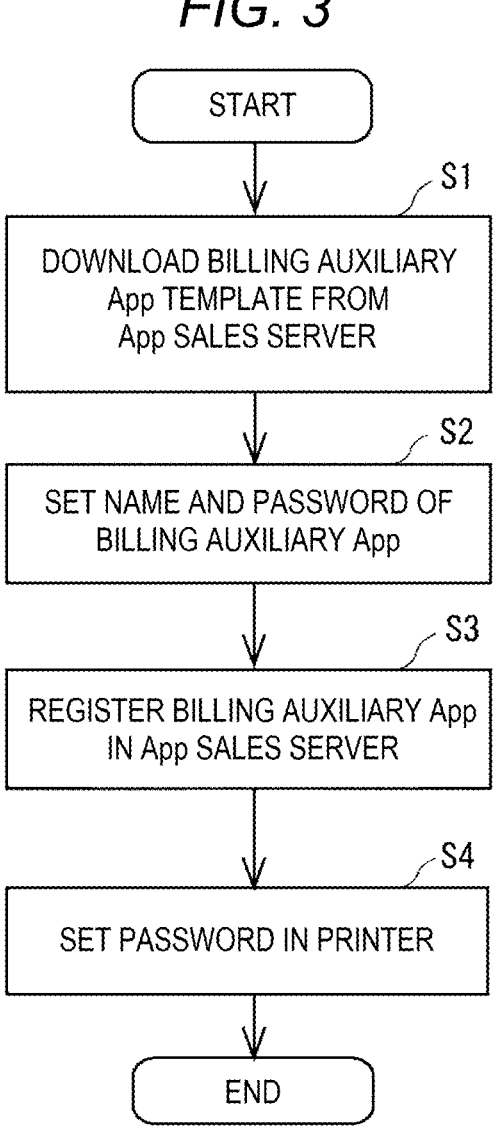
FIG. 3 is a flowchart illustrating an example of processing performed by a printer administrator side in the printing processing illustrated in FIG. 2.

Subsequently, a flow of the printing processing in the print system 100 is schematically explained with reference to FIGS. 2 to 4. FIG. 2 is a schematic diagram schematically illustrating the flow of the printing processing in the print system 100 illustrated in FIG. 1. FIG. 3 is a flowchart illustrating an example of processing performed by a printer administrator side in the printing processing illustrated in FIG. 2. FIG. 4 is a flowchart illustrating an example of processing performed by the user side in the printing processing illustrated in FIG. 2.

First, the printer administrator, who is a business operator providing a billing printing service using the printer A(31) and the printer C(33), downloads the billing auxiliary App template 21 from the App sales server 20 using a terminal device 40 (processing i in FIG. 2). The processing i corresponds to step S1 in FIG. 3. The terminal device 40 is an information processing device like the terminal device 10.

The printer administrator is a billing person who bills a user U of the terminal device 10 for the billing printing service using the printer A(31) and the printer C(33). Thus, the printer A(31) and the printer C(33) are enabled to prohibit printing and the prohibition thereof can be released according to the presence or absence of payment of a price for billing. For that reason, the billing auxiliary App template 21 provided by the App sales server 20 is a template of a PSA that can change a name of PSA, which is a name of the billing auxiliary App 22, and a password of a printer for each printer administrator.

Subsequently, the printer administrator of the printer A(31) and the printer C(33) uses the terminal device 40 to set a name of the PSA and a password common to the printer A(31) and printer C(33) in the downloaded billing auxiliary App template 21. Accordingly, the printer administrator generates the billing auxiliary App 22 (processing ii in FIG. 2). The processing ii corresponds to step S2 in FIG. 3. The name and the password of the PSA can be recorded as set values in the billing auxiliary App 22. The name of the PSA is desirably a name that can be identified by the user. The name can include, for example, a company name of the printer administrator.

Only when the set password is received, the printer A(31) and the printer C(33) permit printing. That is, the password is a lock release password for releasing print lock in the printer A(31) or the printer C(33). As explained above, a password corresponding to an authority to use of the printer A(31) and the printer C(33) is set in the billing auxiliary App 22.

Subsequently, the printer administrator registers the billing auxiliary App 22 in the App sales server 20 as an PSA of the printer administrator (processing iii in FIG. 2). The processing iii corresponds to step S3 in FIG. 3. This registration is provided free of charge or sold in the App sales server 20 in a state in which the billing auxiliary App 22 or the installer of the billing auxiliary App 22 is capable of downloading the registration from the terminal device 10. In step S2, the name and the password of the PSA can also be recorded as a setting file or the like. In this case, in step S3, the billing auxiliary App 22 is configured to be capable of reading the setting file and is registered together with the setting file as a set. A registration name only has to be the set name of the PSA. However, a name obtained by abbreviating the name of the PSA or a name that is more easily understood may be used.

Subsequently, the printer administrator sets passwords for the printer A(31) and the printer C(33) (step S4 in FIG. 3). For example, in the printer A(31), the password is stored in the authentication unit 31a, whereby the password is set. Not only the password but also the name of the PSA corresponding thereto is also set in the authentication unit 31a. In FIG. 2, processing corresponding to step S4 is not illustrated. The password set here is a lock release password. The same password as the password set in step S2 is used. Accordingly, printing cannot be performed in the printer A(31) and the printer C(33) unless a correct password is sent from the PSA illustrated in the billing auxiliary App 17.

The order of the setting of the password to the printer A(31) and the printer C(33) and the generation and the registration of the billing auxiliary App 22 may be opposite. Even if the printer administrator is the same, for example, when it is desired to change a fee structure, two billing auxiliary App 22 may be generated and registered for the printer A(31) and the printer C(33). In this case, a password set in the printer A(31) and a password set in the printer C(33) are different.

The user U desiring printing performs, on the billing auxiliary App 22 registered as explained above, print preparation, and print instruction in a procedure explained below. First, the user U downloads, from the App sales server 20 to the terminal device 10, the billing auxiliary App 22 registered by the printer administrator of the printer A(31), which is a printer desired to perform printing (processing iv in FIG. 2). Here, as described above, for example, the installer of the billing auxiliary App 22 can be downloaded. The processing iv corresponds to step S11 in FIG. 4. Then, the user U installs the billing auxiliary App 22 in the terminal device 10 (step S12 in FIG. 4). The billing auxiliary App 22 after the installation in the terminal device 10 is explained as the billing auxiliary App 17.

Subsequently, the user U starts the billing auxiliary App 17 using the terminal device 10 and, in the billing auxiliary App 17, purchases a point necessary for printing from the App sales server 20 (step S13 in FIG. 4). The purchase of such a point means receiving billing in advance with the billing auxiliary App 17, that is, receiving billing in advance in the application program. Then, the billing auxiliary App 17 records the purchased point in linkage with an account of the application store. Timing of the purchase of the point may be before print instruction of processing vi explained below regardless of before and after the installation of the billing auxiliary App 17.

Subsequently, the user U designates the printer A(31) using the billing auxiliary App 17 and performs various kinds of setting (processing v in FIG. 2). Thereafter, when the user U performs print instruction from the billing auxiliary App 17, the billing auxiliary App 17 transmits print data of a target print file to the printer A(31) via the communication unit 13 (processing vi in FIG. 2). The processing vi corresponds to step S14 in FIG. 4. Here, the billing auxiliary App 17 transmits the set password included in the print data. An example of a method of including the password in the print data is explained below together with a first example to a third example of the printing processing.

The printer A(31) that has received the print data including the password performs authentication by comparing a password set in the printer A(31) and the received password and executes printing if succeeding in the authentication. The billing auxiliary App 17 settles a price of the printing by, for example, subtracting the price from a recorded holding point and receives a print at an installation place of the printer A(31). In response to execution of printing, a profit of the printing is restored to the printer administrator via the App sales server 20, that is, via the application store operated by the vendor of the OS.

As explained above, in the present embodiment, the user U purchases a point necessary for printing in advance via the billing auxiliary App 17. The billing auxiliary App 17 transmits the password to the printer A(31) at the printing start time, releases the lock of the printing function, and executes printing. When the printing s successful, the billing auxiliary App 17 desirably subtracts a point based on information indicating the print data, that is, printing job information. The printer administrator can collect the price of the printing, which is a usage fee, according to a settlement mechanism of the application store provided by the OS vendor. In the present embodiment, since the billing is performed via the application store provided by the OS vendor, it is unnecessary to separately prepare, for billing printing, a settlement system and a billing server.

In the present embodiment, the example is explained in which the billing auxiliary App 17 assists the general-purpose printer driver 16 to perform the billing printing control. However, the billing auxiliary App 17 is not limited to this. For example, the billing auxiliary App 17 can also be used in an environment in which printing control is performed by a printer driver unique to a vendor that does not use the general-purpose printer driver 16, for example, when the billing auxiliary App 17 is not included in the vendor auxiliary App or when the billing auxiliary App 17 does not cooperate with the vendor auxiliary App. In this case, the billing auxiliary App 17 is an application program for assisting the printer driver unique to the vendor and implementing the billing printing. In this case as well, the billing auxiliary App 17 receives billing with the App sales server 20 of the OS vendor.

Although the present embodiment is explained above, it can be said that, in the present embodiment, a printing method including the transmission processing, the billing processing, and the settlement processing can be provided.

In other words, the terminal device 10 includes a transmission processing unit, a billing processing unit, and a settlement processing unit explained below. The transmission processing unit transmits print data to the printer A(31). The billing processing unit receives billing in the App sales server 20 in which the vendor of the OS of the terminal device 10 sells an application program. The settlement processing unit performs settlement when the print data is transmitted and printing is successful in the printer A(31). The terminal device 10 can include the general-purpose printer driver 16. In this case, the vendor of the OS can be the same as the vendor of the general-purpose printer driver 16 but may be different.

Effects of the Embodiment

Before a more specific example of the printing processing in the present embodiment is explained, effects by the present embodiment are explained.

As explained above, in the print system 100, the terminal device 10 is configured to receive billing for printing in the App sales server 20, which is a sales server of the OS vendor, and the terminal device 10 is already in a connectable state to the sales server. For that reason, in the print system 100, it is possible to perform billing without necessity of separately preparing a settlement server that performs settlement corresponding to the billing in a print system that performs billing printing.

In order to supplement such effects, the present embodiment is compared with print systems according to comparative examples 1 and 2. In the print systems according to the comparative examples 1 and 2, for example, a printer is installed in a public place and billing is performed based on the number of prints or the like. The print system according to the comparative example 1 is a system employing a scheme of billing with a coin vendor. The coin vendor is a device attached to the printer. In this system, a user is capable of performing printing by inserting money such as coins into the coin vendor. The print system according to the comparative example 2 is a system employing a scheme of billing with a print administration system. The print management system is a system that collectively manages printing by connecting the printer and a print management system.

However, the print system according to the comparative example 1 mainly has a narrow selection width of a printer adaptable for a printer administrator and cost increases. Specifically, in the comparative example 1, the printer administrator, who is a billing person, needs to introduce the coin vendor that is dedicated hardware. The coin vendor is expensive in itself and an adaptable printer is also generally limited to a multifunction peripheral for business use.

The print system according to the comparative example 2 also mainly has a narrow selection width of a printer adaptable for a printer administrator and cost increases. Specifically, in the comparative example 2, as a first problem, since it is necessary to install a server in the print management system and the server needs to be managed, cost is required for installation and management. In the comparative example 2, as a second problem, since the printer independently communicates with the server, a large-scale mechanism for incorporating a function of an authentication service into a firewall is required in a printer main body. In the comparative example 2, as a third problem, it is essential that the printer is directly connected to a network and the comparative example 2 is not applicable to a printer connected to another information processing device via a USB (Universal Serial Bus). USB is a registered trademark and is the same in the following explanation. Further, in the comparative example 2, as a fourth problem, it is necessary to set an account of a user and complicated operation is required for the printer administrator and the user.

On the other hand, as explained above, in the present embodiment, the exemplified printing control program is introduced in the billing auxiliary App 17 and billing for printing is received in the App sales server 20, which is the sales server of the OS vendor. That is, in the present embodiment, a billing function is provided not by hardware or server software but by an application program such as a PSA.

Thus, in the present embodiment, dedicated hardware is not required unlike the comparative example 1 and a model of an adaptable printer only has to be a model having a user authentication function and a communication function. A printer used for a service can be selected out of a wide variety of models.

In the present embodiment, the disclosure of the printing control program by the PSA and the like is performed for the application store. Therefore, unlike the comparative example 2, it is unnecessary to separately prepare a server and management cost for the server is not required. In the present embodiment, a model of an adaptable printer only has to be adapted to user authentication. A large-scale mechanism is unnecessary on a firewall side. The present embodiment can also be applied to a printer connected to a USB. Further, in the present embodiment, since billing can be performed based on an account of an application store, it is unnecessary to perform processing such as setting a dedicated account for billing printing.

As explained above, in the print system 100 according to the present embodiment, it is possible to bill the user of the printer using the billing auxiliary App 17 without the necessity of introducing a server or dedicated hardware. Thus, according to the present embodiment, it is possible to perform billing without the necessity of preparing a coin vendor unlike the comparative example 1 and without the necessity of separately preparing a settlement server that performs settlement corresponding to billing unlike the comparative example 2.

First Example of the Printing Processing

Figure 5:
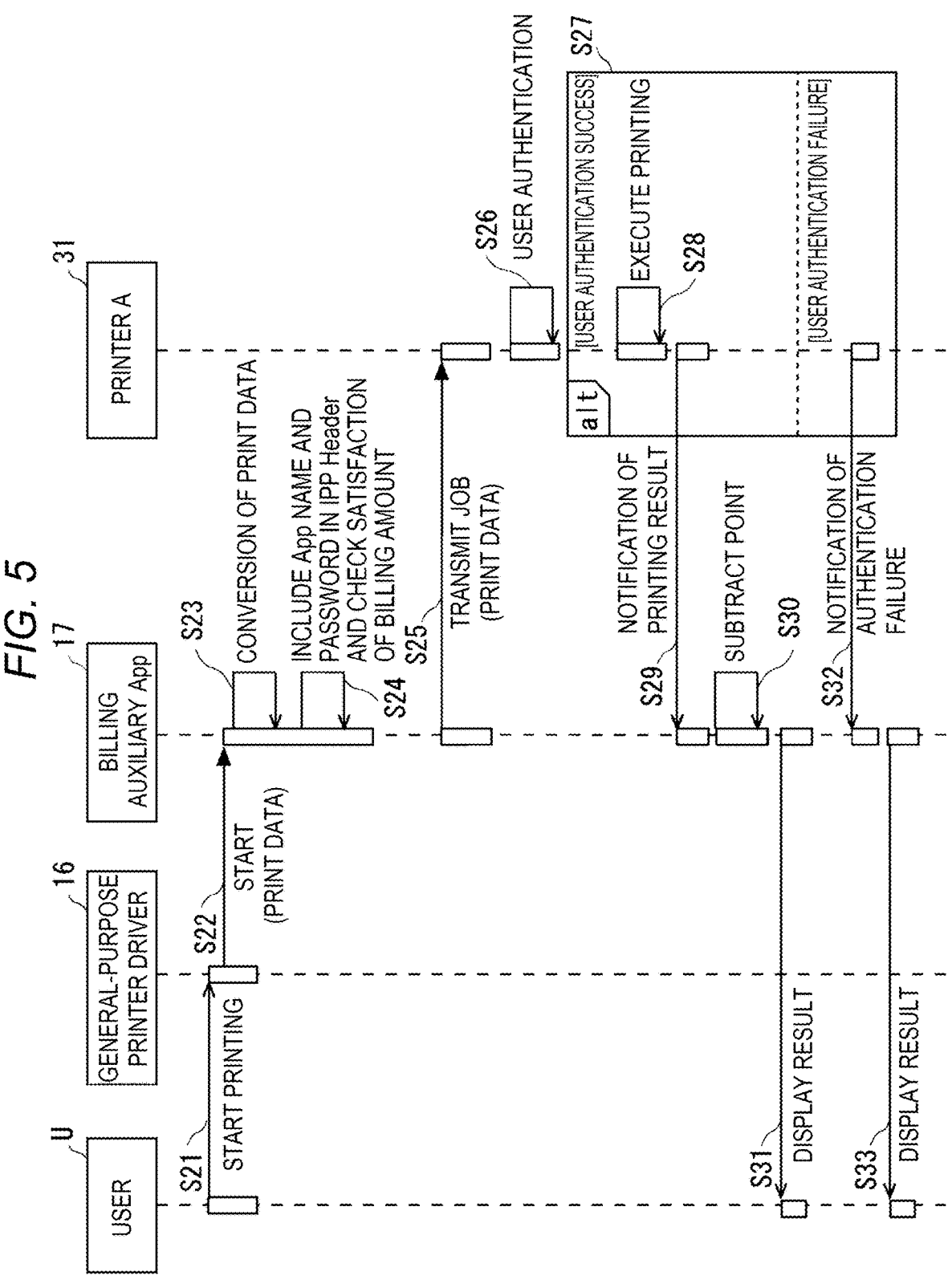
FIG. 5 is a sequence diagram illustrating a first example of the printing processing in the print system illustrated in FIG. 1.

A first example of the printing processing is explained with reference to FIGS. 5 and 6. FIG. 5 is a sequence diagram illustrating the first example of the printing processing in the print system 100 illustrated in FIG. 1. FIG. 6 is a diagram illustrating an example of information referred to in the first example explained with reference to FIG. 5.

Print data transmitted to the printer A(31) in transmission processing in the first example can include, for example, a header, an IPP attribute, and PDL data. PDL is an abbreviation for Page Description Language. In the transmission processing in the first example, the print data including the password explained above in the header of the IPP is transmitted to the printer A(31).

First, the user U selects a print target file such as a document file in the terminal device 10 and performs, from the operation unit 14, for example, operation for performing printing in the printer A(31). Alternatively, the user U starts an application program for, for example, starting and editing a print target file in the terminal device 10 and performs, from the operation unit 14, for example, operation of selecting the printer A(31) in print setting for the print target file. Alternatively, the user U starts the general-purpose printer driver 16 in the terminal device 10 and performs operation of selecting the print target file and the printer A(31). In all the kinds of operation, operation of selecting printing in the billing auxiliary App 17 instead of selecting the printer A(31) can also be applied.

Based on such operation, the general-purpose printer driver 16 receives an instruction to start printing in the printer A(31) or an instruction to start printing in the printer corresponding to the billing auxiliary App 17 (step S21).

The general-purpose printer driver 16, which has received the print start instruction from the user U, generates print data of the print target file and starts the billing auxiliary App 17, which is a billing auxiliary App corresponding to the printer A(31) (step S22). In step S22, the general-purpose printer driver 16 also transmits the print data of the print target file to the billing auxiliary App 17. Communication between the general-purpose printer driver 16 and the billing auxiliary App 17 is inter-process communication.

The billing auxiliary App 17, which has received the print data, converts the print data (step S23). In step S22, the general-purpose printer driver 16 may start the billing auxiliary App 17 and transmit information concerning the printing target file or a storage destination thereof to the billing auxiliary App 17. In this case, in step S23, the print data is generated from the print target file.

Subsequently, the billing auxiliary App 17 edits, for the converted print data, an IPP Header to include a name, which is an application name, and a password of a PSA in a Header of an IPP (step S24). By embedding the name and the password of the PSA equivalent to an ID in the Header of the IPP, authentication can be performed using basic authentication of an HTTP in the printer A(31).

Further, in step S24, prior to transmission of print data in the next step S25, the billing auxiliary App 17 calculates a billing amount, which is a point necessary for printing for the print data, and checks whether a holding point is sufficient for the billing amount.

This calculation refers to the IPP Attribute and determines the billing amount based on, for example, a size of a document, a color, a type indicating single-sided printing or double-sided printing, and the number of prints. The color can indicate color printing or monochrome printing. The billing auxiliary App 17 desirably sets a required amount larger as the size of the document is larger and sets the required amount larger for the color printing than the monochrome printing. The billing auxiliary App 17 desirably sets the required amount larger for double-side printing than single-side printing and sets the required amount larger in proportion to the number of prints.

Specifically, the billing auxiliary App 17 desirably calculates the billing amount for the converted print data referring to the following information of the IPP Attribute illustrated in a table 60 exemplified in FIG. 6. The table 60 indicates a size of a document, a color, both sides/one side, and the number of pages as function names and indicates a media-size, a print-color-mode, sides, and pages as IPP Attributes corresponding to the respective function names. As explained above, the billing auxiliary App 17 serving as the PSA can analyze the inside of the print job according to the IPP and determine the billing amount based on content of the print job. To supplement, the PSA can acquire information concerning the print job according to the specifications of the IPP and can determine the billing amount based on the information.

Naturally, a calculation method for the billing amount and setting contents serving as a basis of the calculation are not limited to these examples. The printer administrator only has to set the calculation method and the setting contents by, for example, adding calculation corresponding to a type of a document such as photograph paper or plain paper or calculation according to printing speed of the printer. The printing speed of the printer is desirably set to increase a unit price in a printer having high printing speed referring to "pages-per-minute" that is an Attribute of the printing speed of the IPP. As explained above, the billing auxiliary App 17 may change the billing amount according to specifications such as attribute information of a target printer acquired by the IPP. The billing auxiliary App 17, which is the PSA, can acquire information indicating the specifications of the target printer directly or via the general-purpose printer driver 16 based on the IPP. Thus, the billing auxiliary App 17 can change the billing amount according to the specifications of the printer using this mechanism.

When the holding point is insufficient for the billing amount, the billing auxiliary App 17 desirably notifies an error to the user U via the general-purpose printer driver 16 or directly.

On the other hand, when the holding point is not insufficient for the billing amount, the billing auxiliary App 17 transmits the print data to the printer A(31) as a print job (step S25). Communication between the billing auxiliary App 17 and the printer A(31) is desirably executed according to a protocol obtained by vendor extension of the IPP. Alternatively, in step S25, the billing auxiliary App 17 may transmit the print job to the general-purpose printer driver 16 and the general-purpose printer driver 16 may transmit the print job to the printer A(31) according to the IPP. As explained above, the communication between the general-purpose printer driver 16 and the printer A(31) is IPP communication.

In all the cases, the printer A(31) can receive an IPP packet necessary for printing. The printer A(31) compares a password included in the print data received as explained above and a password set in the printer A(31) to determine whether the passwords coincide with each other. According to such comparison, the printer A(31) performs user authentication as to whether the user U who has transmitted the print data is the user of the printer A(31) (step S26). The authentication unit 31$a$ provided in the printer A(31) desirably executes this user authentication.

Subsequently, the printer A(31) performs processing corresponding to a user authentication result in step S26 (step S27). In step S27, when succeeding in the user authentication, the printer A(31) executes printing based on the received print job (step S28). Then, the printer A(31) directly returns a result of the printing to the billing auxiliary App 17 as a status of the print job (step S29). In step S29, the printer A(31) may return the printing result to the general-purpose printer driver 16. In that case, the general-purpose printer driver 16 only has to transmit the printing result to the billing auxiliary App 17.

The billing auxiliary App 17 refers to the status of the print job and, when the printing result indicates that the printing is successful, executes point subtraction processing of reducing the holding point of the user U by a price of the printing (step S30). As explained above, the billing auxiliary App 17 has a mechanism of purchasing a point necessary for printing in advance and, when the printing is successful, subtracting the point from the held point. The status of the print job can be regarded as success of the printing, for example, when printing success is received in "Job Notification Event", which is a mechanism capable of acquiring a job state of the PSA.

Then, the billing auxiliary App 17 notifies the success of the printing and the result of the point subtraction processing to the user U (step S31). On the other hand, when the billing auxiliary App 17 refers to the status of the print job and the printing result indicates failure in the printing, the billing auxiliary App 17 only has to notify the failure in the printing to the user U without reducing the holding point of the user U.

On the other hand, when the user authentication result in step S26 indicates that both the passwords do not coincide with each other, the printer A(31) determines that the authentication has failed and directly returns notification of an error to the billing auxiliary App 17 (step S32). Then, the billing auxiliary App 17 notifies the notified error to the user U (step S33). In step S32, the printer A(31) may notify the error to the general-purpose printer driver 16. In that case, the general-purpose printer driver 16 only has to transmit the notified error to the billing auxiliary App 17.

When the general-purpose printer driver 16 receives an instruction to start printing in the printer corresponding to the billing auxiliary App 17 in step S1, the user U only has to perform operation explained below. That is, the user U only has to select the printer A(31) out of the corresponding printer A(31) and printer C(33) after the billing auxiliary App 17 is started and before the transmission of step S25.

Even when the print data or the print target file is transmitted in step S22, when the billing auxiliary App 17 has the function unique to the printer described in the vendor auxiliary App, for example, detailed print setting based on this function may be accepted from the user U. Accordingly, the billing auxiliary App 17 can generate print data based on the detailed print setting.

As explained above, in the first example of the printing processing, the print data including the password in the Header of the IPP is transmitted to the printer A(31). Thus, in the first example, only by adding simple processing, user authentication in the printer A(31) can be executed using, for example, basic authentication of the HTTP and lock of the print function can be released. That is, printing in the printer A(31) is possible only when the user U instructs printing using the billing auxiliary App 17. In the first example, for example, the billing auxiliary App 17 serving as the PSA or the like can read a name of an application and a password of printer from an internal setting value or an external setting file. Since the billing auxiliary App 17 has such a simple configuration, the printer administrator can easily set up, exclusively for the printer administrator, the billing auxiliary App 22 used in the terminal device 10 as the billing auxiliary App 17. Then, the printer administrator only has to register the billing auxiliary App 22 in the application store and set passwords in the printer A(31) and the printer C(33).

As explained concerning the calculation of the billing amount in step S24, in the settlement processing in the first example, when a current holding point is insufficient for a price point, which is a price of printing, the transmission of the print data by the transmission processing is prohibited. Here, the price point is as explained in the calculation of the billing amount. In the settlement processing, in order to obtain the current holding point, a point is desirably counted when a price of billing is paid in billing processing. In the settlement processing, as described in step S30, when the print data is transmitted in the transmission processing and printing is successful, settlement is performed by subtracting the price point from the holding point. According to such settlement processing, billing can be performed only when printing is successful.

Although the example is explained in which the holding point is managed by the billing auxiliary App 17, the information indicating the App holding point may be shared with the App sales server 20. Alternatively, the App sales server 20 may manage the information and the billing auxiliary App 17 may acquire the information according to necessity.

Further, in step S25, the example is explained in which the billing auxiliary App 17 notifies an error when the holding point is insufficient and transmits the print data when the holding point is not insufficient. As explained above, in the transmission processing in the first example, the print data may be transmitted to the printer A(31) via the general-purpose printer driver 16 when the holding point is not insufficient for the price point and an error may be notified to the general-purpose printer driver 16 when the holding point is insufficient.

By adopting such transmission processing, the holding point does not become insufficient after the transmission of the print data. The user U can instruct printing within the current holding point. Thus, by adopting such transmission processing, it is unnecessary to purchase a point after the transmission of the print data. It is possible to avoid an increase in load of the print system 100 due to transmission of unnecessary print data.

As explained about the calculation of the billing amount in step S24 and the point subtraction processing in step S30, in the settlement processing in the first example, processing explained below may be performed. That is, in the settlement processing, when the printing is successful, the price point, which is the price of the printing, may be subtracted from the current holding point based on the Attribute of the IPP. As explained above, the holding point can be a point that is counted when the price of the billing is paid in the billing processing. In this case as well, as explained above, in the transmission processing, the print data is transmitted to the printer A(31) via the general-purpose printer driver 16 that performs communication according to the IPP. Alternatively, the billing auxiliary App 17 may directly transmit the print data to the printer A(31) according to a protocol obtained by the vendor extension of the IPP. According to such settlement processing, it is possible to easily calculate a price point and settle a printing price.

Second Example of the Printing Processing

Figure 7:
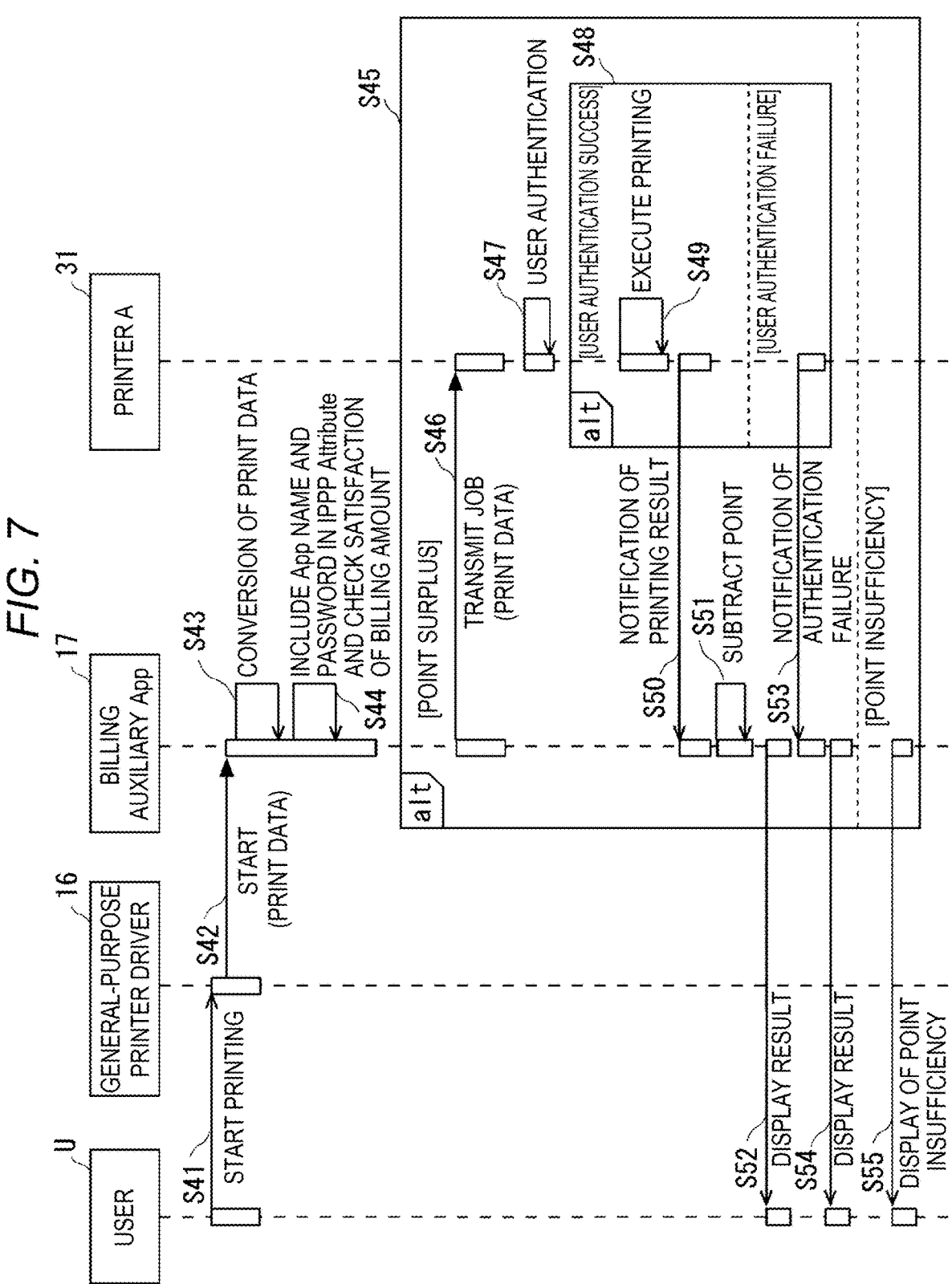
FIG. 7 is a sequence diagram illustrating a second example of the printing processing in the print system illustrated in FIG. 1.

A second example of the printing processing is explained with reference to FIG. 7. FIG. 7 is a sequence diagram illustrating the second example of the printing processing in the print system 100 illustrated in FIG. 1.

In the second example, instead of the Header of the IPP in the first example, a password is included in the Attribute of the IPP in print data transmitted to the printer A(31). Thus, processing in the second example is basically the same as the processing in the first example except processing incidental to a change of a position of such a password.

Also in the second example as well, the processing in steps S21 to S23 in the first example are applied (steps S41 to S43). Next, the billing auxiliary App 17 edits, for the converted print data, an IPP Attribute to include a name, which is an application name, and a password of a PSA in the IPP Attribute (step S44). For example, the billing auxiliary App 17 performs editing to include the name and the password of the PSA in "requesting-user-name" of the IPP Attribute.

Further, in step S44, prior to transmission of the print data in step S46 explained below, the billing auxiliary App 17 calculates a billing amount, which is a point necessary for printing for the print data, and checks whether a holding point is sufficient for the billing amount. The method explained in the first example can be applied to the calculation of the billing amount.

Subsequently, the billing auxiliary App 17 performs processing corresponding to the holding point (step S45). Step S45 includes steps S46 to S55 explained below. First, when the holding point is not insufficient for the billing amount, the billing auxiliary App 17 transmits such print data to the printer A(31) as a print job as in step S25 (step S46).

Subsequently, as in step S26, the printer A(31) performs user authentication as to whether the user U is the user of the printer A(31) (step S47). However, in step S47, in the user authentication, a position where a password and the like are read in the received print data is different. The password and the like are read from the Attribute of the IPP rather than the Header of the IPP.

Subsequently, as in step S27, the printer A(31) and the billing auxiliary App 17 perform processing corresponding to a user authentication result in step S47 (step S48). That is, in step S48, the same processing as steps S28 to S33 is performed (steps S49 to S54).

On the other hand, when the holding point is insufficient for the billing amount, the billing auxiliary App 17 desirably notifies an error indicating the holding point insufficiency to the user U via the general-purpose printer driver 16 or directly (step S55). In FIG. 7, a sequence in the case in which the holding point is insufficient is also illustrated. Although omitted in FIG. 5 in the first example, the sequence of this portion is the same in FIG. 5 in the first example.

Although the second example of the printing processing has basically the same effects as the effects of the first example, the password can be set in the print data by a method different from the method in the first example.

Third Example of the Printing Processing

Figure 8:
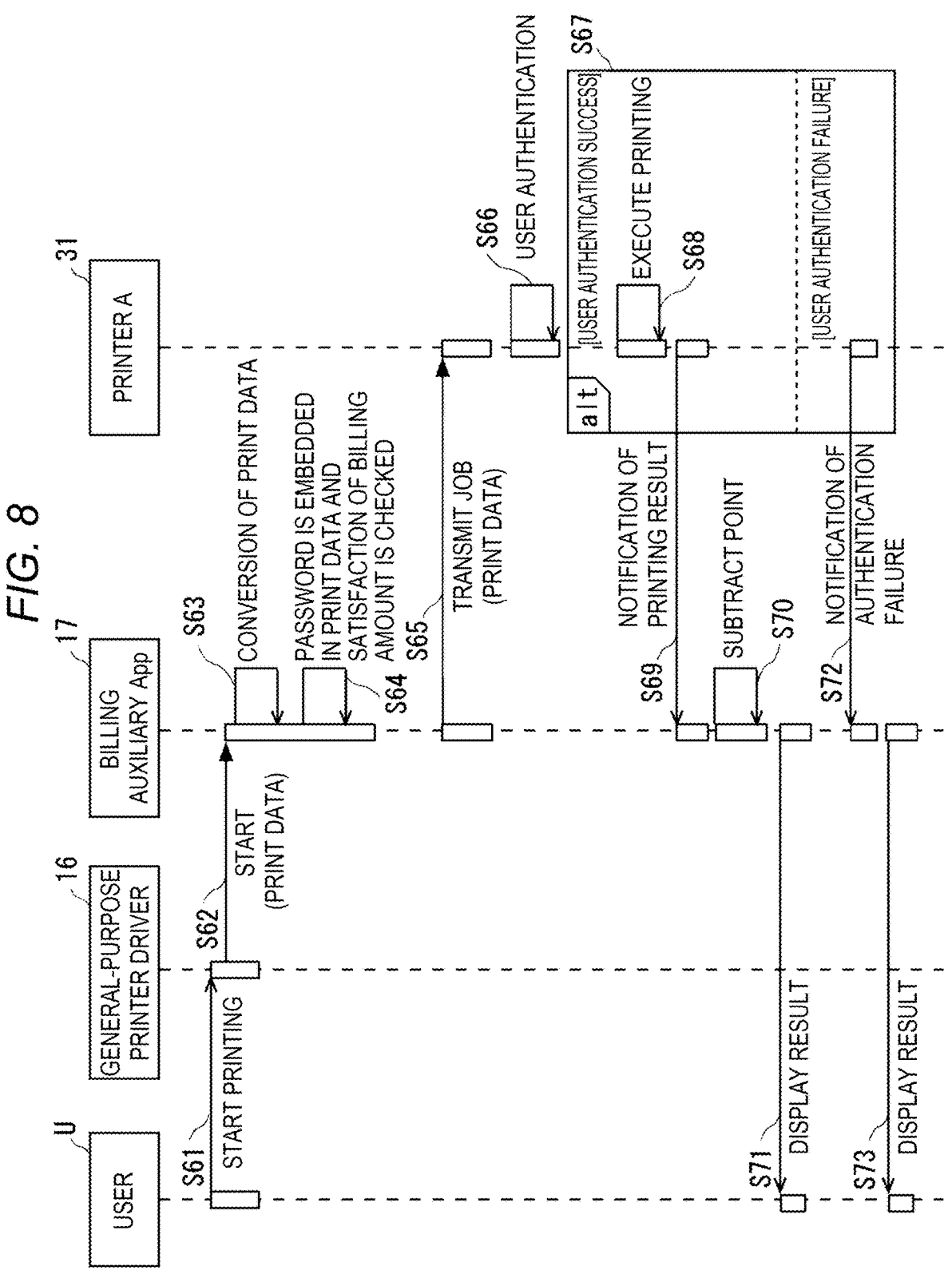
FIG. 8 is a sequence diagram illustrating a third example of the printing processing in the print system illustrated in FIG. 1.

A third example of the printing processing is explained with reference to FIG. 8. FIG. 8 is a sequence diagram illustrating the third example of the printing processing in the print system 100 illustrated in FIG. 1.

In the third example, instead of the Header of the IPP in the first example, a password is included in the PDL in the print data transmitted to the printer A(31). Thus, processing in the third example is basically the same as the processing in the first example except processing incidental to a change of a position of such a password.

In the third example as well, the processing in steps S21 to S23 in the first example is applied (steps S61 to S63). Subsequently, the billing auxiliary App 17 edits, for PDL data in the converted print data, the PDL data to include a name, which is an application name, and a password of a PSA in the PDL data (step S64). As a method of embedding information in the PDL data, for example, a known method known as an electronic watermark method only has to be used.

In step S64, prior to transmission of print data in step S65 explained below, as in step S25 in the first example, the billing auxiliary App 17 calculates a billing amount and checks whether a holding point is sufficient for the billing amount. Subsequently, as in step S25, the billing auxiliary App 17 transmits such print data to the printer A(31) as a print job (step S65).

Subsequently, as in step S26, the printer A(31) performs user authentication by comparing a password included in the received print data with the password set in the printer A(31) and determining whether the passwords coincide with each other (step S66). However, in step S66, in the user authentication, a method of reading a password and the like from the received print data is different. In the third example, the authentication unit 31a provided in the printer A(31) has a function of recognizing a password and the like from the PDL data.

Thereafter, in the third example as well, the same processing as steps S27 to S33 in the first example is performed (steps S67 to S73). In the third example as well, as illustrated in FIG. 7 in the second example, a sequence in the case in which the holding point is insufficient is omitted.

In the third example of the printing processing as well, effects that are basically the same as the effects by the first example and the second example are achieved. However, the password can be set in the print data by a method different from the method in the first example and the second example.

Other Modifications

The present disclosure is not limited to the embodiment explained above and can be changed as appropriate without departing from the gist of the present disclosure. For example, the system configuration of the print system, the configurations of the devices configuring the system, the configurations of the programs included in the devices, the processing procedures of the devices, and the like are not limited to the exemplified ones. The sales server in which the vendor of the OS sells the application program is not limited to the server managed and operated by the vendor itself. The sales server is a broad concept including a server approved by the vendor such as a server entrusted with operation by the vendor.

Figure 9:
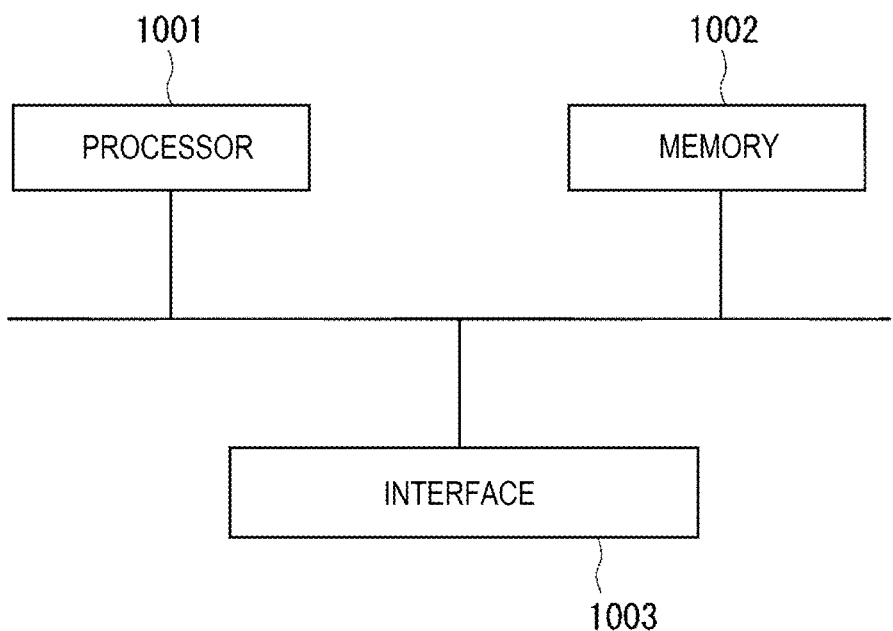
FIG. 9 is a diagram illustrating an example of a hardware configuration of a device.

All of the devices provided in the print system according to the embodiment explained above can include, for example, hardware components explained below. Here, in the examples illustrated in FIGS. 1 and 2, examples of the devices include a terminal device used by the user, a terminal device used by the printer administrator side, an application sales server, and printers. FIG. 9 is a diagram illustrating an example of hardware components of a device.

A device 1000 illustrated in FIG. 9 can include a processor 1001, a memory 1002, and an interface 1003. The interface 1003 can include, for example, a communication interface and an interface with an input and output device that are required according to the device.

The processor 1001 may be, for example, a CPU, a GPU, or a microprocessor unit (MPU) also referred to as microprocessor. The processor 1001 may include a plurality of processors. The memory 1002 is configured by, for example, a combination of a volatile memory and a nonvolatile memory. Functions in the devices are implemented by the processor 1001 reading a program stored in the memory 1002 and executing the program while exchanging necessary information via the interface 1003.

The program includes an instruction group (or software codes) for causing a computer to perform the one or more functions explained in the embodiment when the program is read in the computer. The program may be stored in a non-transitory computer-readable medium or a tangible storage medium. Not as a limitation but as an example, the computer-readable medium or the tangible storage medium includes a random-access memory (RAM), a read-only memory (ROM), a flash memory, a solid-state drive (SSD), or another memory technology. Not as a limitation but as an example, the computer-readable medium or the tangible storage medium includes a CD-ROM, a digital versatile disc (DVD), a Blu-ray (registered trademark) disk, or another optical disc storage or a magnetic cassette, a magnetic tape, a magnetic disk storage, or another magnetic storage device. The program may be transmitted on a transitory computer-readable medium or a communication medium. Not as a limitation but as an example, the transitory computer-readable medium or the communication medium includes a propagation signal of an electric, optical, acoustic, or another form.

The present disclosure is explained above with reference to the embodiment. However, the present disclosure is not limited to only the configuration in the embodiment explained above. It goes without saying that the present disclosure includes various modifications, alterations, and combinations that can be made by those skilled in the art within the scope of the disclosure of the claims of the present application. For example, the disclosure of the printing method can be grasped as disclosure of a method of producing a print.

What is claimed is:

1. A non-transitory computer-readable storage medium storing a printing control program configured to assist an OS general-purpose printing program that provides printing functions usable for a plurality of types of printers, the printing control program causing a computer to execute:

transmission processing of transmitting print data to a printer;

billing processing of receiving billing in a sales server in which a vendor of an operating system of the computer sells an application program; and settlement processing of performing settlement when the print data is transmitted and printing is successful in the printer.

2. The non-transitory computer-readable storage medium storing the printing control program according to claim 1, wherein the printing control program is a Print Support Application.

3. The non-transitory computer-readable storage medium storing the printing control program according to claim 2, wherein the sales server is a sales server that downloaded the Print Support Application to the computer.

4. The non-transitory computer-readable storage medium storing the printing control program according to claim 1, wherein, in the transmission processing, the print data is transmitted to the printer via a general-purpose printer driver.

5. The non-transitory computer-readable storage medium storing the printing control program according to claim 1, wherein, in the settlement processing, a point is counted when a price for billing is paid in the billing processing, transmission of the print data by the transmission processing is prohibited when a current holding point is insufficient for a price point, which is a price of the printing, and settlement is performed by subtracting the price point from the holding point when the print data is transmitted in the transmission processing and the printing is successful.

6. The non-transitory computer-readable storage medium storing the printing control program according to claim 5, wherein, in the transmission processing, the print data is transmitted to the printer via a general-purpose printer driver when the holding point is not insufficient for the price point, and an error is notified to the general-purpose printer driver when the holding point is insufficient for the price point.

7. The non-transitory computer-readable storage medium storing the printing control program according to claim 1, wherein the print data includes a password corresponding to authority to use the printer.

8. The non-transitory computer-readable storage medium storing the printing control program according to claim 7, wherein the print data includes the password in a header of an Internet Printing Protocol.

9. The non-transitory computer-readable storage medium storing the printing control program according to claim 7, wherein the print data includes the password in an Attribute of an Internet Printing Protocol.

10. The non-transitory computer-readable storage medium storing the printing control program according to claim 7, wherein the print data includes the password in a Page Description Language.

11. The non-transitory computer-readable storage medium storing the printing control program according to claim 1, wherein in the settlement processing, a point is counted when a price for billing is paid in the billing processing, and when the printing is successful, a price point, which is a price of the printing, is subtracted from a current holding point based on an Attribute of an Internet Printing Protocol.

12. A printing control device comprising:

a memory configured to store an OS general-purpose printing program that provides printing functions usable for a plurality of types of printers, and a printing control program that assists the OS general-purpose printing program; and a processor configured to execute the printing control program to cause the processer to serve as a transmission processing unit configured to transmit print data to a printer;

a billing processing unit configured to receive billing in a sales server in which a vendor of an operating system of the printing control device sells an application program; and a settlement processing unit configured to perform settlement when the print data is transmitted and printing is successful in the printer.

13. A printing method executed by a printing control program configured to assist an OS general-purpose printing program that provides printing functions usable for a plurality of types of printers, the printing method comprising:

transmission processing of a computer transmitting print data to a printer;

billing processing of the computer receiving billing in a sales server in which a vendor of an operating system of the computer selling an application program; and settlement processing of the computer performing settlement when the print data is transmitted and printing is successful in the printer.

* * * * *